United States Patent [19]

McGahee et al.

[11] Patent Number: 4,862,628
[45] Date of Patent: Sep. 5, 1989

[54] SIDE STEPPER WORMS

[75] Inventors: Welbourne D. McGahee, Melbourne, Fla.; John W. Campbell, Montgomery, Ala.

[73] Assignee: Loop-A-Line, Inc., Melbourne, Fla.

[21] Appl. No.: 307,098

[22] Filed: Feb. 7, 1989

[51] Int. Cl.⁴ ............................................. A01K 85/00
[52] U.S. Cl. ...................................... 43/42.24; 43/43.2
[58] Field of Search .................... 43/42.24, 43.2, 42.1, 43/42.41, 43.2, 42.39

[56] References Cited

U.S. PATENT DOCUMENTS

| 1,010,481 | 12/1911 | Crane et al. | 43/42.24 |
|---|---|---|---|
| 1,663,080 | 3/1928 | Heddon . | |
| 2,644,265 | 7/1953 | Stettner . | |
| 2,811,804 | 11/1957 | Heath | 43/42.1 |
| 3,698,119 | 10/1972 | Levoin . | |
| 3,849,928 | 11/1974 | Collins | 43/42.41 |
| 3,978,606 | 9/1976 | Riggs | 43/42.24 |
| 3,979,853 | 9/1976 | Storm et al. . | |
| 4,098,017 | 7/1978 | Hall . | |
| 4,337,591 | 7/1982 | Gell et al. . | |
| 4,367,607 | 1/1983 | Hedman | 43/42.24 |
| 4,597,216 | 7/1986 | B/ rshol | 43/43.2 |
| 4,783,928 | 11/1988 | Weaver | 43/42.24 |

Primary Examiner—M. Jordan
Attorney, Agent, or Firm—Harold Gell

[57] ABSTRACT

A fishing lure including a membrane extending from the lure body dimensioned to fill the gap between the lure and a fishing hook rigged on the lure.

30 Claims, 13 Drawing Sheets

New Method

Old Method  New Method

SIDE STEPPER WORMS

FIELD OF THE INVENTION

This invention is directed to weedless artificial fishing lures incorporating a flexible membrane dimensioned to fill the hook gap.

BACKGROUND OF THE INVENTION

Since the invention of the first bone fish hook, man has been trying to improve fishing lure systems and solve the problem of hooks snagging obstructions. Unfortunately the attempts have all been directed to shielding the hook point. No one has paid any attention to the problem caused by the area formed by the hook's shank and curved portion and an artificial lure which together form a three sided enclosure. This enclosure traps obstructions with more tenacity than a hook point and regardless of how you're hung up, you're still hung up. Another problem with contemporary lure systems is keeping the weight in place other than by crimping the sinker on the line which weakens the fishing line.

A further problem which must be addressed is the use of rattles in artificial worm lures. The prior method is to force a plastic rattle into the worm body. This practice causes two problems: (1) the plastic material is expanded and bulges in an abnormal fashion, causing the worm to look deformed; (2) the plastic rattle is muffled by the plastic material and the only thing that can move is the rattle beads and the rattle cannot resonate properly.

SUMMARY OF THE INVENTION

The principal objective of the present invention is to improve and eliminate the snagging potential of the entire rigged fishing system, as opposed to the prior custom of just protecting the hook point.

Another objective is to provide a means to determine where the hook point should penetrate the artificial lure material to properly seat the hook to protect the entire rigged system.

A still further objective is to form artificial lure material so it will mate to all styles of hooks and fit all types of artificial lures.

Another objective is to form the artificial lure material so it will not prevent the hook point from being easily set in the fishes' mouth.

A further objective is to make one size worm fit a variety of hook sizes.

A still further objective is to form an artificial worm so that the sinker can be carried inside the lure body without distorting the lure and overcome the problem that exist with prior systems where the sinker is in front of the worm and sliding up and down the line, causing the lure and sinker to twirl around in a circle as it is cast.

Another objective is to form a sinker in such a manner as to allow a rattle to be enclosed in the sinker body.

A further objective is to enclose the sinker in lure material to eliminate the chances of the sinker fouling on debris.

A still further objective is to cause the worm's nose section to remain angled in an upwards position instead of always being nose down as is the present case with the sinker in front of worm's nose.

Another objective is to enable the rattle to move more freely than in prior systems and to prevent rattle muffle due to the rattle being forced into the plastic material.

A further objective is to provide a means for holding the rattle bead container so it will move freely in all directions, thereby giving a greater noise level.

A still further objective is to allow a sinker and contained rattle to be able to be easily installed, yet not easily displaced during casting and retrieving of the lure.

A further objective is to make it possible to change weights and their positions to change the center of gravity in order to control how the worm settles to the bottom as it's worked on a retrieve.

A still further objective is to disperse fish attractants better.

These and other objectives and advantages will become apparent as the specification is considered with the accompanying drawings wherein.

DETAILED DESCRIPTION

Figure 1:
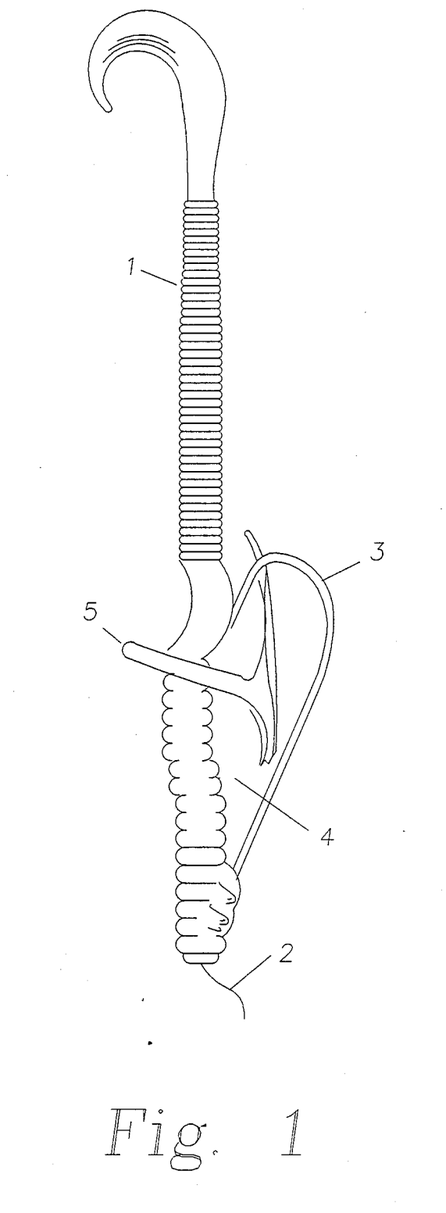
FIG. 1 illustrates the problem encountered with the present state of the art in artificial lures when rigged onto a hook in a Texas Rig.
Figure 2:
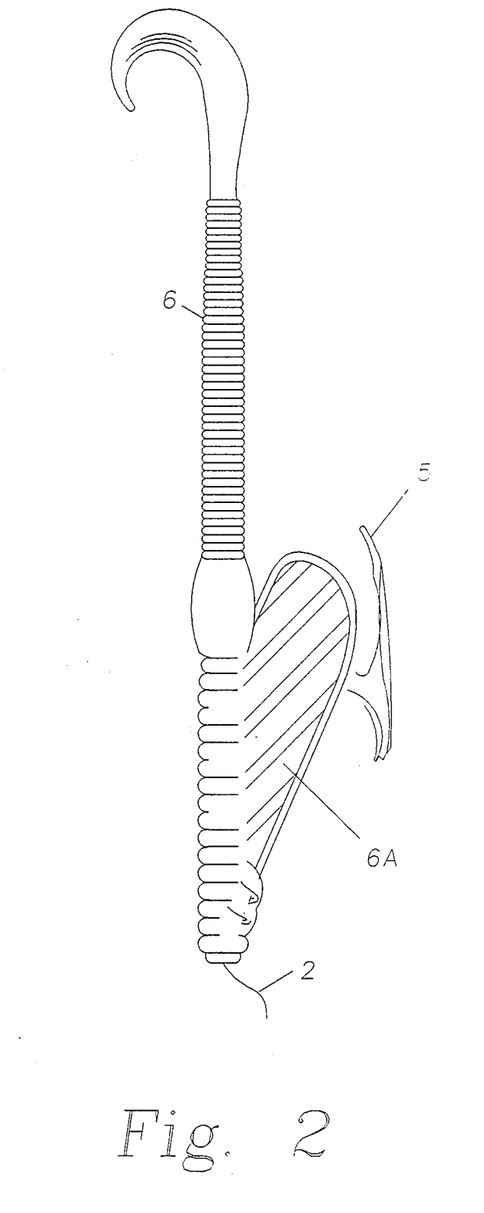
FIG. 2 illustrates the solution to the problem illustrated by FIG. 1, the present invention.

Referring more particularly to the drawings wherein similar reference characters designate like parts throughout the several views and especially FIGS. 1 and 2. In FIG. 1, 1 identifies a standard prior art artificial worm lure, 2 is a fishing line attached to the hook and worm combination, 3 is the shank portion of the hook and 4 is the entire area enclosed by the hook and worm. This area, the hook gap, 4, is the problem area that causes the hook to become entangled with obstructions, both in and out of the water.

In FIG. 1, area 4 has become entangled with an obstruction 5. In FIG. 2 the membrane 6A has caused the worm 6 to ride clear of the obstruction 5, thereby ensuring a safe return of the lure.

Figures 3, 4:
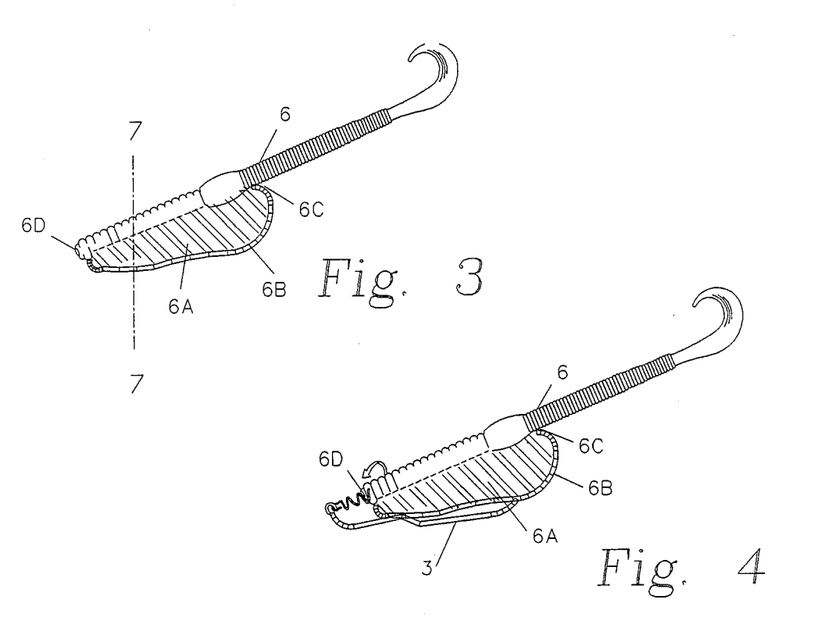
FIG. 3 illustrates an artificial lure in the shape of a worm with the improvement of an embodiment of the subject invention formed onto the worm. This style is for use with hooks using securing means shown in FIGS. 9 through 12.
FIG. 4 illustrates a worm incorporating the invention being placed on a Tru Turn style hook with a Tru Turn worm holding device.
Figures 5, 6:
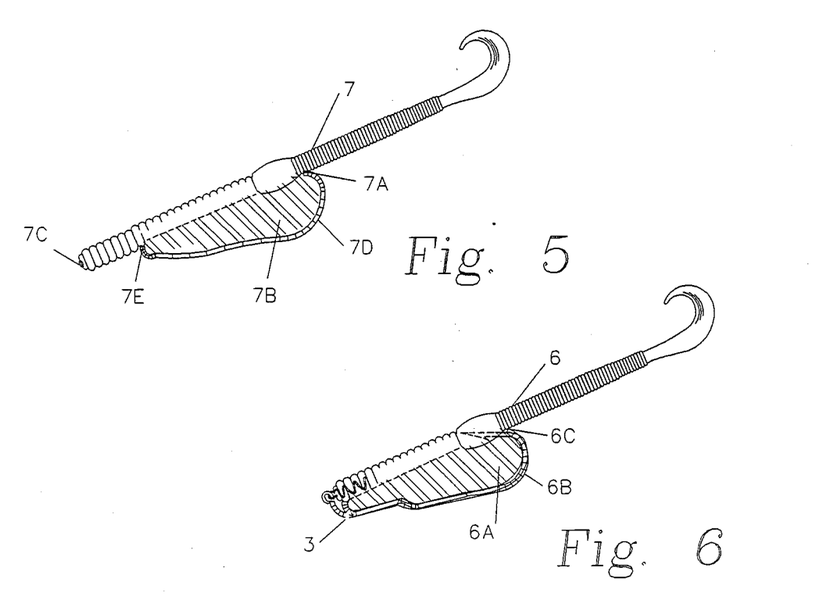
FIG. 5 illustrates another artificial lure formed in the shape of a worm. This worm is designed to work with the hooks shown in FIGS. 13 through 20.
FIG. 6 illustrates the embodiment of FIG. 3 in place on a Tru Turn hook and secured by the type of device used in FIG. 4.
Figure 7:
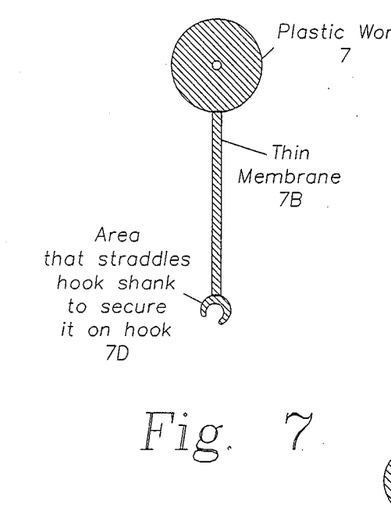
FIG. 7 is a cross section of a worm lure taken along line 7—7 of FIG. 3.
Figure 8:
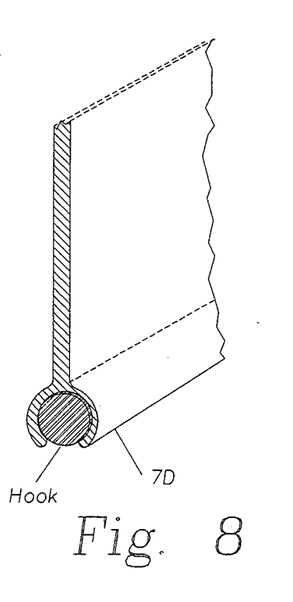
FIG. 8 is a portion of the sectional view of FIG. 7 illustrating the hook shank securing means.

In FIG. 4, the saddle area 6B of membrane 6A is formed past the height of contour of the hook's shank 3 in order to hold this section of the worm onto the hook (see FIGS. 6, 7 and 8). Section 6B shown in FIG. 3, and 7D in FIG. 5 are formed thick enough to make 6B stay on the hook's shank area. Section 6A and 7B are a membranes thin enough so as not to hinder the hook's point from being set in the fish's mouth when the fish strikes the hook/worm combination.

FIGS. 3 and 5 illustrate two different worm shapes which make the system adaptable to all the different types of hooks available. While several types of hooks are shown, other shapes of artificial worms and lures can be formed to make use of this new protective and performance enhancing invention.

In FIG. 4, 6C is dimensioned so the hook point will penetrate the worm 6 to fit properly in area 6B as illustrated in FIG. 4. A preformed hole, 6D, in front of worm 6 aids in the proper placement of the hook point by providing a guide for the securing device. Thus the hook is always set properly in the worm and the hook shank 3 will fit properly into the saddle area 6B. In FIG. 5 the artificial worm 7 includes a thin protective membrane 7B which safeguards area 4 of FIG. 1. A hole, 7A, is preformed in worm 7 to ensure proper placement of hook point to ensure alignment of the hook curve and shank into area 7D of the worm. A preformed hole, 7C, in nose of worm ensures proper placement of the hook eye and area 7C helps hold the worm to prevent slippage down the hook's shank. A preformed hole, 7E, in lure 7 aids in locating the hook point exit to ensure proper seating of the hook into the saddle area 7D. In FIG. 6, 6 is an alternate embodiment of an artificial worm with a protective area 6A. A preformed hole, 6C, is positioned in worm 6 to assist in the proper alignment of the hook, 3, and saddle area 6B. The cross section of artificial worm 7 illustrated in FIG. 7 illustrate the relative dimensions of the thin membrane 7B which protects area 4 shown in FIG. 1 and primary lure body which includes an end thick enough to receive a helical securing means 10. The saddle area 7D, of worm 7 holds the hook shank and curved area of hook as shown in FIG. 8.

Figure 9:
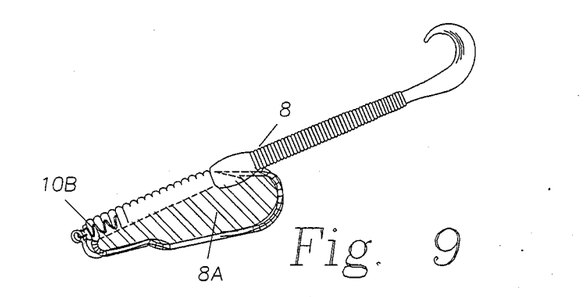
FIG. 9 illustrates an artificial worm lure embodiment of the type presented in FIG. 3 attached to a Tru Turn hook.
Figure 10:
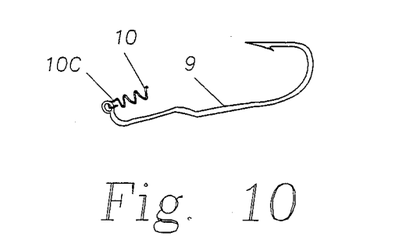
FIG. 10 illustrates a Tru Turn hook and EZ Hold securing device which is the subject of the co-pending patent application Ser. No. 07/238,490 for "Coupling Means For Securing Plastic Worms To Fish Hooks".
Figure 11:
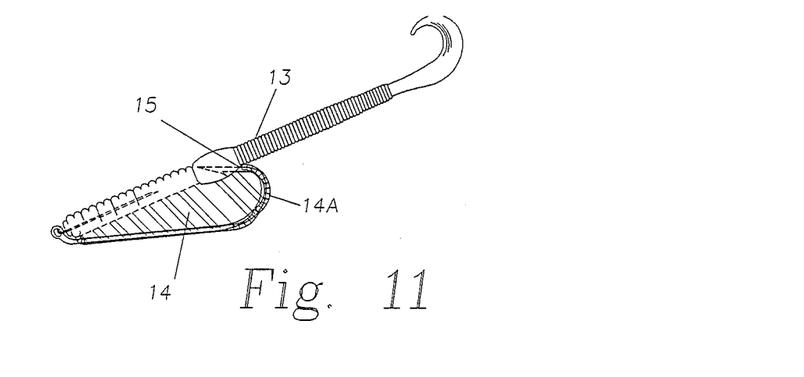
FIG. 11 illustrates a worm lure incorporating an embodiment of the present invention on an alternate style hook with an alternate worm keeper method.
Figure 12:
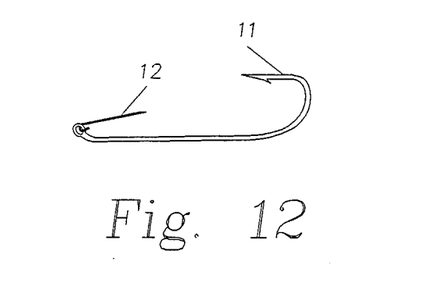
FIG. 12 illustrates a hook of the type used in FIG. 11.
Figure 13:
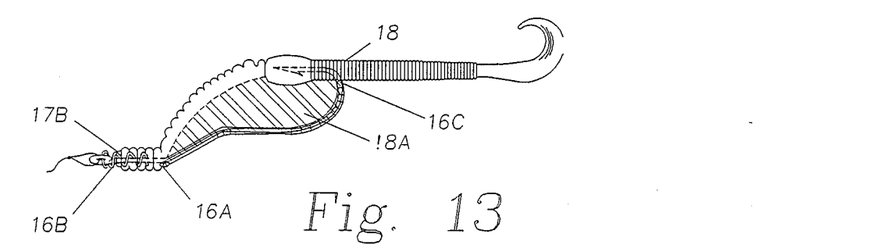
FIG. 13 illustrates an alternate style worm incorporating the invention installed on a Tru Turn hook.
Figure 14:
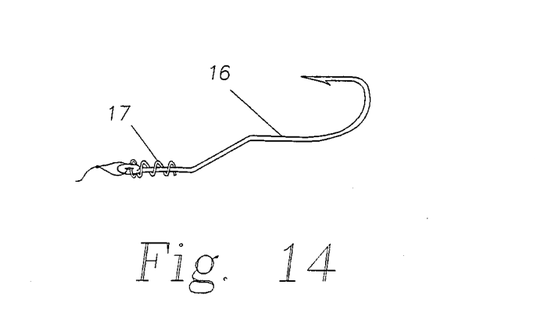
FIG. 14 illustrates the Tru Turn hook with a Stay Put holding device in place.

In FIG. 9, 8A is the protective membrane which protects area 4 of FIG. 1. An EZ hold, 10B, is embedded in the worm 8 of FIG. 9 to secure the lure to the hook. The hook, 9, shown in isolation in FIG. 10 includes an EZ Hold helical worm securing device 10 attached to the hook eye by a bent section which forms a clip 10C which permits break-away removal by twisting the securing means in a direction which will open the clip. In FIG. 9, the securing device 10B, is embedded in the worm 8 by rotating it onto the securing device. A hook, styled after the Mister Twister hook is illustrated with a straight barb worm keeper 12 in FIG. 12. The worm 13 in FIG. 11 includes a protective membrane 14 which includes a saddle area 14A. A preformed hole, 15, is provided for hook point reentry positioning. A barb is embedded into the worm 13 as a holding means. The hook 16, in FIG. 14 is a Tru Turn style hook and 17 is a Tru Turn Stay Put worm securing device of the type presented in the co-pending application Ser. No. 07/238,490 patent which is attached to the hook by screwing it through the hook eye. In FIG. 13, the worm 18 includes three preformed holes, one, 16B in nose area of the worm 18, the second 16A along the worm body, and the third hole 16C. Hole 16B marks where the hook point should enter the worm and 16A shows where hook point should exit the worm 18 for proper mating of the worm to the hook, hole 16C shows proper reentry of hook point into worm 18. A thin membrane 18A protects the area of space 4 of FIG. 1.

Figure 15:
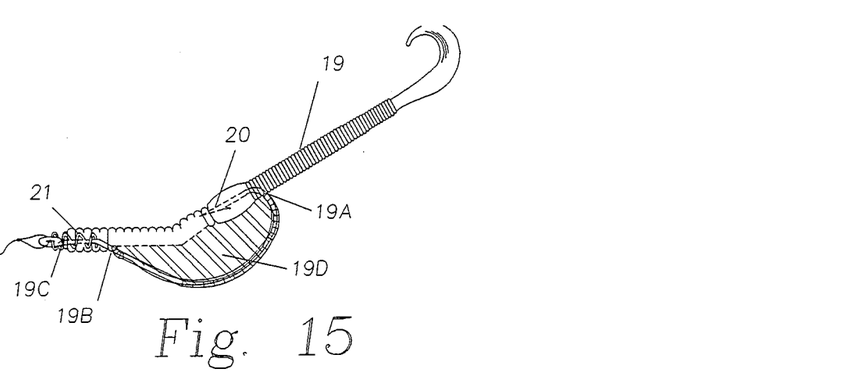
FIG. 15 illustrates an embodiment of the worm lure on a Eagle Claw style hook.
Figure 16:
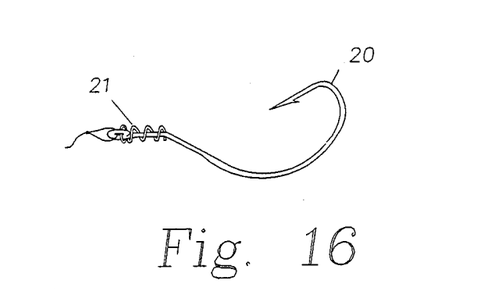
FIG. 16 illustrates the hook shown in FIG. 15 with a Tru Turn Stay Put worm securing device in place for use with the present invention.
Figure 17:
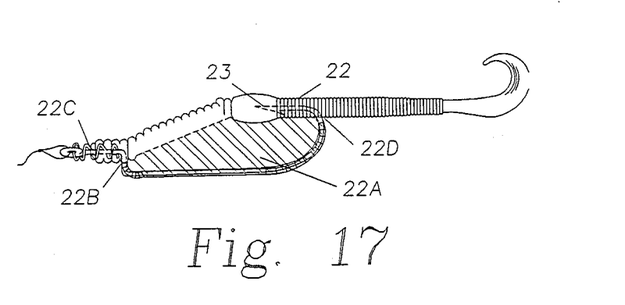
FIG. 17 illustrates an embodiment of the invention installed on the hook and worm securing combination shown in FIG. 18.
Figure 18:
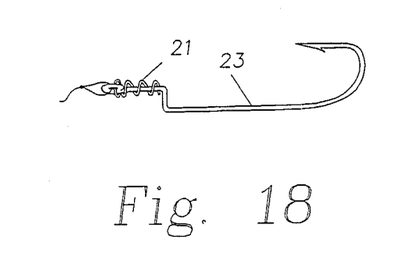
FIG. 18 is an Eagle Claw hook with a Tru Turn Stay Put worm securing device in place for receiving an embodiment of the invention similar to that illustrated in FIG. 17.

FIG. 15 illustrates an alternate worm style with a hook 20 in place. The hook is of Eagle Claw design and shown in detail in FIG. 16. A Stay Put worm holding device 21 is threaded about the hook shank and shown embedded in the worm nose in FIG. 15. A preformed hole 19C in worm 19 marks the proper entry for the hook into the worm. A preformed hole 19B marks the proper exit spot for the hook point to ensure proper placement of the hook around area 19D. A preformed hole 19A in the worm body shows the proper reentry point for the hook into the worm 19. FIG. 17 illustrates a worm, 22, for use with an Eagle Claw hook design of the type illustrated in FIG. 18. A protective membrane 22A fills and protects the area 4 of FIG. 1 A preformed hole 22C in the worm nose marks the proper entry point for the hook point into worm and the preformed hole 22B show the proper exit for the hook point from the worm. The preformed hole 22D marks the proper reentry point for the hook point into worm to ensure placement of hook around the area to be protected. The hook, 23, includes bends in shank as shown in FIG. 18.

Figure 19:
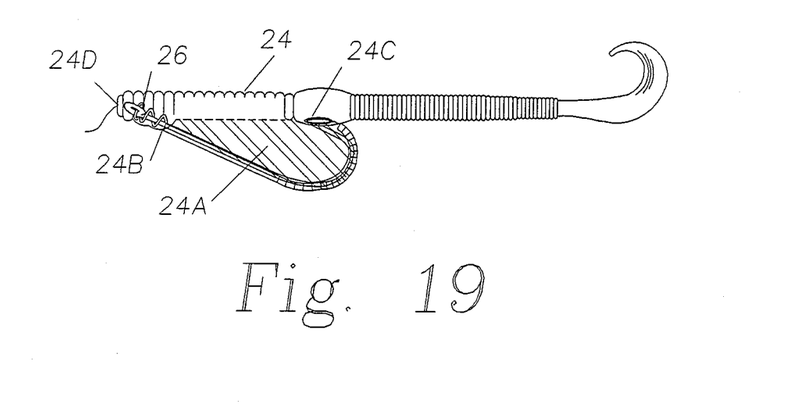
FIG. 19 illustrates an embodiment of the invention on a straight shank design.
Figure 20:
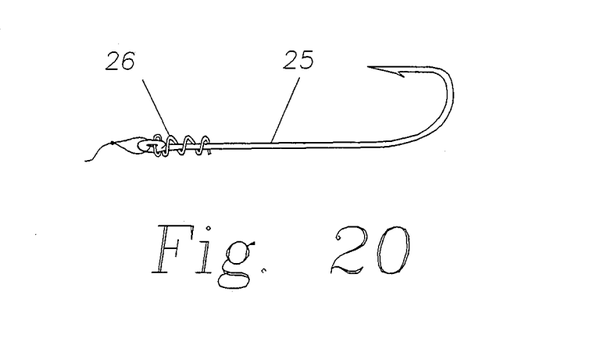
FIG. 20 illustrates the hook used in FIG. 19 with a Tru Turn Stay Put worm saver in place for securing an embodiment of the invention.

A Mustad style hook 25 is illustrated in FIG. 20. This style hook has a straight shank but the membrane 24A is flexible enough to form into the protected area as illustrated in FIG. 19. A preformed hole 24D in the worm nose, marks the proper entry point for the hook point when threading the worm onto the hook. A preformed hole 24B shows the proper exit for the hook point from the worm and preformed hole 24C marks the proper reentry point for the hook point into worm to ensure a proper fit of the worm protective membrane into area 4 of FIG. 1. In FIG. 20, the Mustad style hook 25 is fitted with a Tru Turn Stay Put worm holding device. In FIG. 19, the Stay Put 26 is embedded in worm nose.

The various style hooks are presented to illustrate the versatility of lures incorporating the invention and are not to be construed as limiting but rather as an indication that the invention may be used with any hook design.

Figure 21:
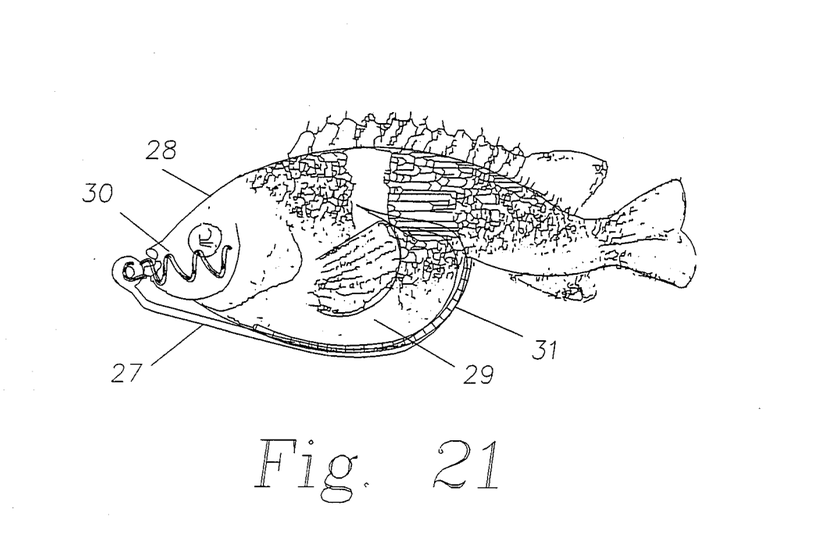
FIG. 21 illustrates an artificial lure in the shape of a fish using the protective membrane system of the present invention.

FIG. 21 illustrates an artificial lure emulating a fish. It incorporates the same thin membrane concept used in the worm lures.

The lure body 28 is held on the hook 27 by an embedded Stay Put securing device 30 which holds the lure so that the hook fits in the saddle area 31 and the protective membrane 29 fills the hook/lure gap.

The hook is attached to the artificial worm lure in the following manner for worms of the type shown in FIGS. 2, 3, 4, 5, 6, 7, 8, 9, 11, 13, 15, 17, 19, 21: The point of the fish hook is forced coaxially into the nose portion of the artificial worm lure and then forced therethrough to exit from the side of the worm lure at a point spaced longitudinally from the nose of the lure by a distance somewhat greater than the length of the shank section of the hook. The ease of insertion is a function of the sharpness of the hook point and the softness of the artificial lure material. The worm is slid along the hook towards hook eye, passing around the curved throat portion of the hook and up to the beginning of hook shank area to engage the sharp end of the securing helix or EZ hold. The artificial worm lure is rotated around the axis of the hook shank section while applying pressure to engage the artificial worm and helix, continuing rotation until the head of the artificial worm lure has been screwed up and over hook eye and onto the fishing line.

The hook is rotated 180 degrees and the hook point is forced into the artificial worm body. The hook is forced into the body far enough to allow the hook's barb to engage the material without the hook point protruding through the worm body. The saddle area of the membrane is then pushed onto the hook's shank and curved area.

Figure 22:
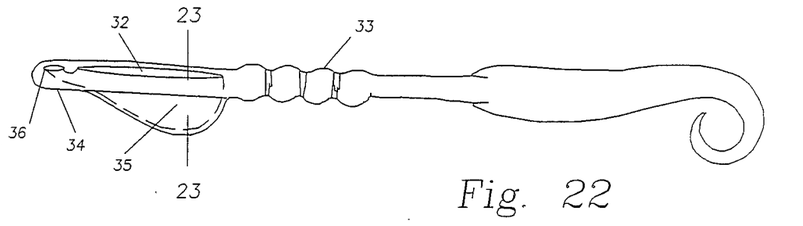
FIG. 22 illustrates an artificial worm incorporating an alternate embodiment of the invention with a pocket in the membrane. The pocket is designed to accept all sizes and types of hooks as contrasted to the previously illustrated embodiments which are designed to fit one style and size of hook.

In the embodiment discussed thus far, protective membranes have a single solid piece with a groove for the hook shank the outer edge of the membrane as best seen in FIGS. 7 and 8. The following artificial lures incorporate a double walled pocket into which the hook is inserted. This pocket is illustrated in cross-section in FIG. 23 which is taken along line 23 of FIG. 22. The artificial worm lure 33 includes a protective pocket membrane 35 which has a preformed slot 32 which forms a pocket for the hook to go into after passing through the large diameter section 34 of the worm 33.

Figures 23, 24, 25:
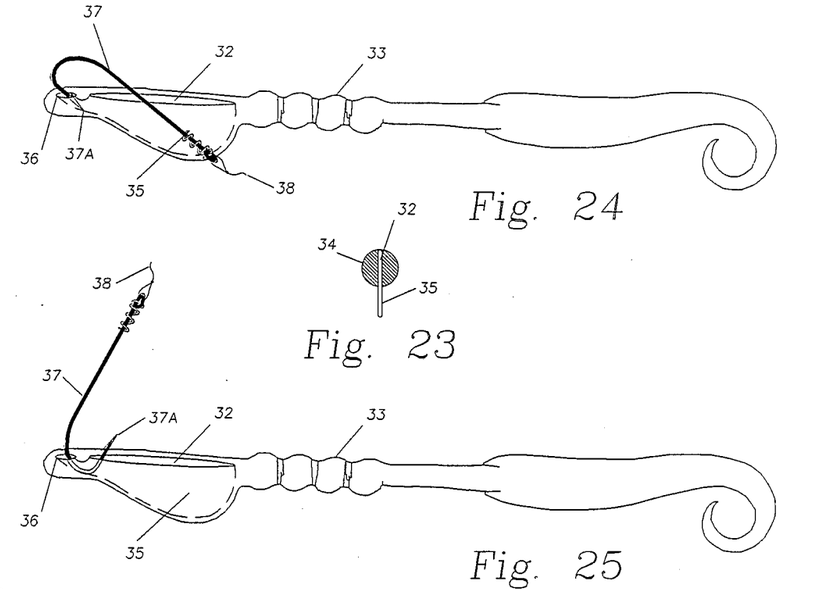
FIG. 23 illustrates is cross section of worm shown in FIG. 22 taken along line 23—23.
FIG. 24 illustrates the first step in inserting a hook into the pocket of an worm membrane.
FIG. 25 illustrates the second step of hook insertion with the hook point protruding from the pocket opening.
Figure 26:
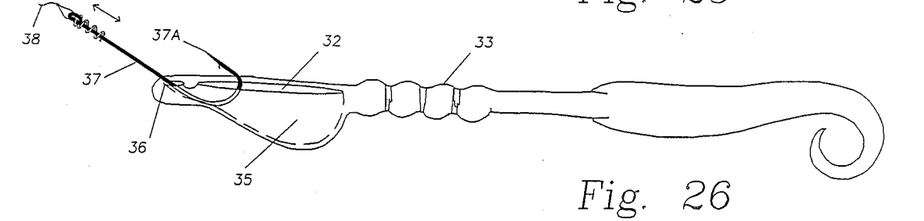
FIG. 26 illustrates the third step of hook insertion into the protective membrane pocket. The hook can now move up and down as indicated by the arrow.
Figure 27:
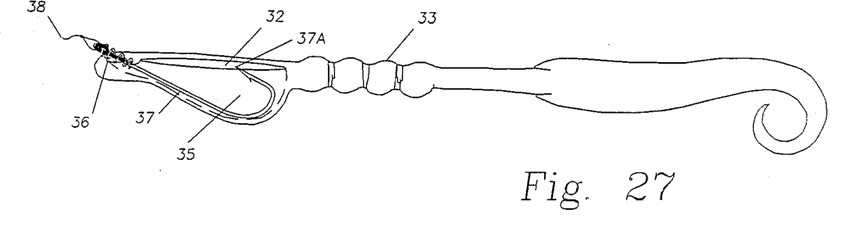
FIG. 27 illustrates the final position of the hook inside the protective membrane pocket with the hook point positioned to engage the larger diameter of the worm body.
Figure 28:
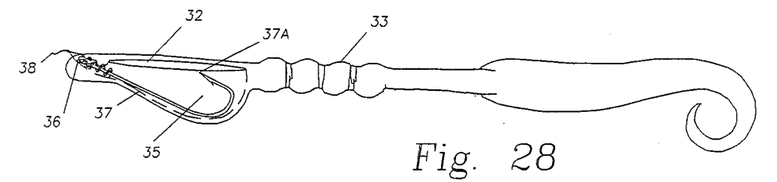
FIG. 28 is a view of an artificial worm with the pocket cutaway to show the position of the hook inside the protective membrane pocket when a maximum size hook is used.
Figure 29:
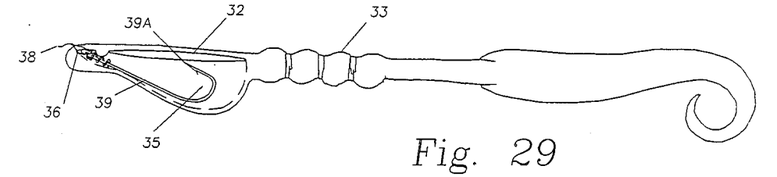
FIG. 29 is a view of an artificial worm with the pocket cutaway to show the position of a medium size hook inside the protective pocket membrane.
Figure 30:
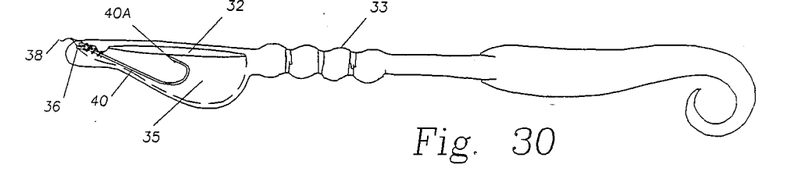
FIG. 30 is a view of an artificial worm with the pocket cutaway to show the position of a small hook.
Figure 31:
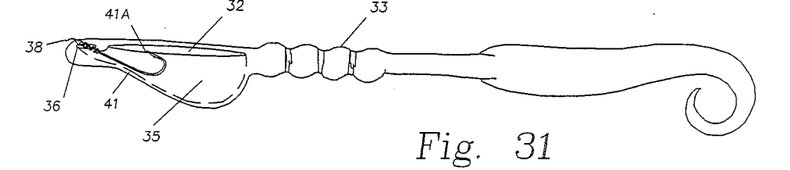
FIG. 31 is a view of an artificial worm with the pocket cutaway showing the position of a very small hook in the protective membrane pocket.

FIGS. 24, 25 26 and 27 illustrate the sequence of steps required to insert a hook into the protective membrane pocket 32. In these figures, 33 is the lure body, 32 is a pocket inside the protective membrane 35, and 36 is a preformed hole for marking the proper entry point for the hook point 37A of the hook 37. A fishing line 38 is attached to the hook 37. In FIG. 24, the hook point 37A has penetrated the preformed hole 36 and is just entering the inside of the protective pocket 32 of the membrane 35. The next step is illustrated by FIG. 25 which shows the hook point exiting the pocket. In FIG. 26 the hook shank 37 is in the process of sliding through the hole travelled by the hook point 37A in the previous step. Hole 36 may be a simple mark to guide positioning of the hook point with the hole through the worm body being formed as the hook is forced through the lure material or hole 36 may be a preformed bore forming a channel into the pocket. The hook shank 37 and point 37A are moved into the protective pocket 32 of the membrane 35 in FIG. 27. With the hook shank 3 and hook point 37A entirely inside the protective pocket 32 of the worm 33, the hook point 37A is moved slightly to one side or the other to engage an inside wall of the preformed slotted portion of worm body in area 35.

FIGS. 28, 29, 30, 31 illustrate different size hooks being used with a standard size worm to graphically show the primary difference between the two major embodiments. In the first embodiment illustrated in FIGS. 2, 3, 4, 5, 6, 7, 8, 9, 11, 13, 15, 17, 19, and 21, the hook and worm must fit each other. In the pocket embodiment illustrated in FIGS. 22, 23, 24, 25, 26, 27, 28, 29, 30, 31, 32, and 33, any size hook within a broad range may be used.

Figure 32:
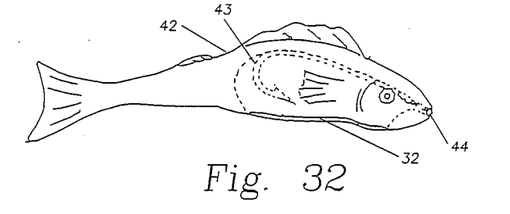
FIG. 32 illustrates an artificial lure in the shape of a fish including a pocket with the hook point down.
Figure 33:
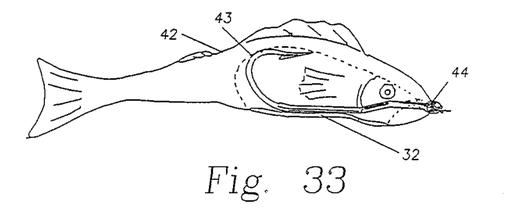
FIG. 33 illustrates an artificial lure in the shape of a fish including a pocket with the hook point up.

FIGS. 32 and 33 illustrate a fish design lure using the preferred protective pocket membrane 32 where 42 is the entire lure body, 43 is the protected hook and 44 is a preformed hole for guiding proper hook point entry into the lure body. The hook 43 is pointing down in FIG. 32 but it can be pointing up if desired as illustrated by FIG. 33. In this case, the hook will have to be set through the thick portion of the lure body.

The protective pocket serves other purposes as well as protecting the hook. For instance, fish attractants have been hard to use because they wash off of the bait rapidly. The pocket solves this problem. A foam material 32A is shaped to fit into the protective membrane pocket 32 in FIG. 34 The foam is saturated with an attractant which is slowly dispersed into the water through the pocket entry slot.

Figure 34:
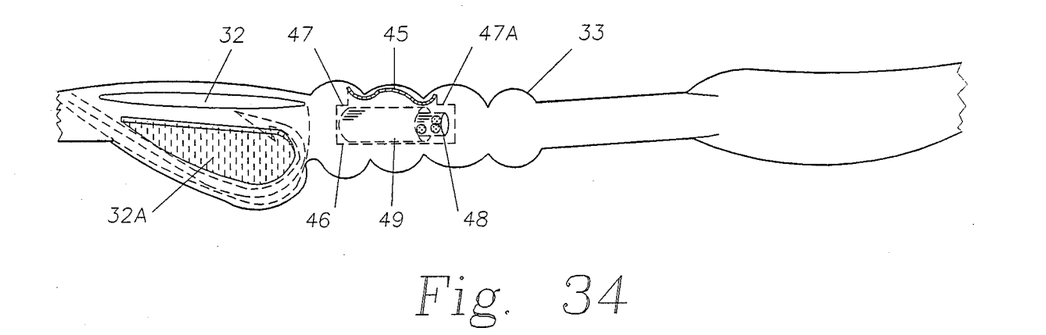
FIG. 34 is a view of an artificial lure cutaway to show a rattle partially enclosed in a hollow sinker. In use, the rattle is as shown in FIG. 40.

FIGS. 34 through 47 illustrate a further embodiment of the invention where a second pocket is formed in the lure body. In FIG. 34, 45 is a preformed entrance slot for inserting a sinker and rattle into the preformed cavity 46. The cavity includes overlap areas 47 and 47A which are created because the cavity space 46 is longer than the entrance slot. The overlap areas 47 and 47A keep the sinker in place during casting and retrieving. A rattle 48 containing rattle beads is located in the hollow sinker 49.

Figure 35:
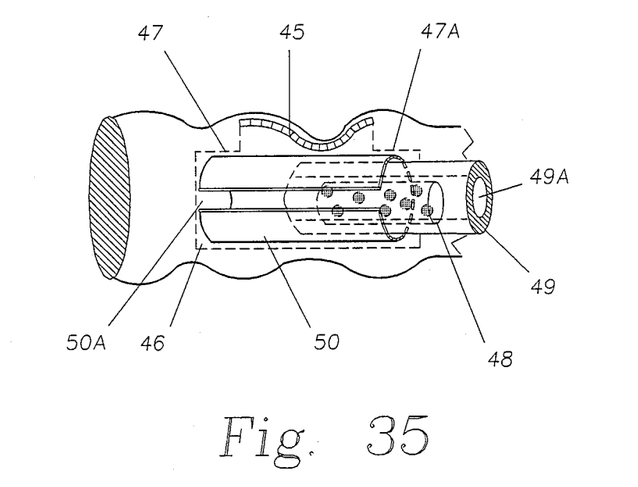
FIG. 35 is a partial view of the embodiment illustrated in FIG. 34 illustrating the rattle and sinker in place in the lure body. The rattle is shown partially outside of the sinker to show where rattle is inserted. In a fishing mode, the rattle should be as shown in FIG. 40.
Figure 36:
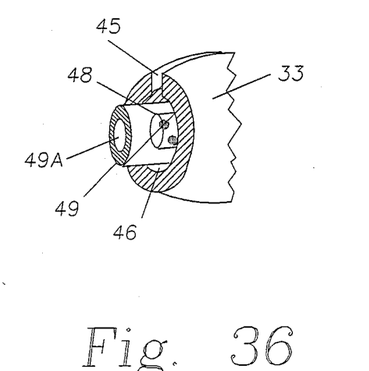
FIG. 36 is a cutaway section of a worm lure and hollow sinker and rattle illustrating the slot formed in the worm body which provides access to the preformed cavity for the sinker and rattle. The rattle is shown in an exposed position outside the cavity for the purpose of showing rattle. In fishing mode, the rattle would be as shown in FIG. 40.
Figure 37:
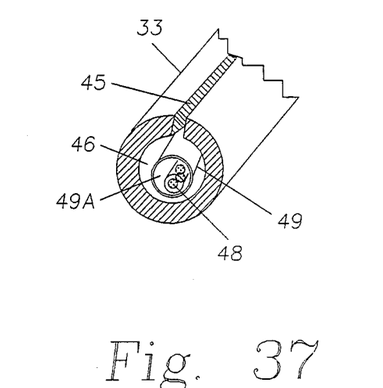
FIG. 37 is a cutaway section of worm, rattle and sinker, illustrating the preformed cavity which receives the sinker. Extra space is provided for the sinker and the rattle to move so the rattle will make the loudest noise. The entrance slot for the rattle and sinker is also illustrated.
Figure 38:
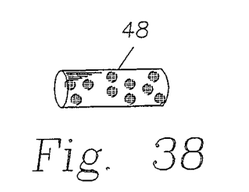
FIG. 38 illustrates the rattle which goes inside the hollow sinker.
Figure 39:
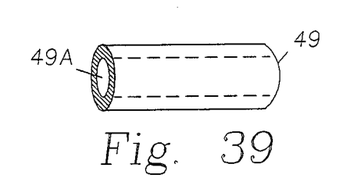
FIG. 39 illustrates the hollow lead sinker which receives rattle shown in FIG. 38.

An ordinary sinker may be in the second pocket 46 but a hollow metal sinker adapted to receive sinker rattle parts is preferred. In FIGS. 34 through 47, 50 is a tension retainer and weight adjuster sleeve, 50A is a slot in the sleeve which is best seen in FIG. 35. This allows the sleeve to expand around weight 49. The sleeve 50 makes it possible to use different weights in the lure cavity and also allows changing the lure's center of gravity by shifting the weight forward or rearward within the sleeve. The slot 50A allows tension to be applied to the rattle and/or weight to hold them at selected positions to control the center of gravity. The position of the cavity within the lure may be controlled during manufacture to control the range of possible centers of gravity.

Placement of the sinker and rattle in the pocket 46 as illustrated in FIG. 34 makes the worm fall slightly rearward instead of falling nose down. This gives a more lifelike motion to the worm when working the worm on a retrieve, making it easier to lure fish into striking.

Another advantage of this position of the sinker and rattle is a relatively lighter nose section which causes the nose to ride slightly upwards. Therefore it is less likely to become entangled in the underbrush. This new angle of the worm allows the worm to be worked off the bottom better, and to be worked through and around trash areas where the fish hide for protection.

The sinker 49 can be positioned in sleeve 50 to vary the lure's center of gravity. This provides a means to control the angle of the worm's descent. In prior systems, only the amount of weight could be controlled. The cavity 46 is longer than the entrance slot 45 and once the weight 49 and rattle 48 is in place, the weight is retained in place by the overlap areas 47 and 47A as seen in FIG. 35.

The direction of the force required to insert the weight through slot 45 and into cavity 46 is at 90 degrees to the casting and retrieving forces, therefore, casting and receiving cannot dislodge the weight 49 from the cavity 46. During casting, the weight is forced against area 47A.

Figure 40:
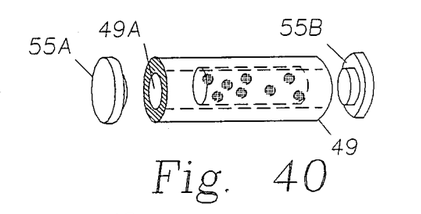
FIG. 40 illustrates the sinker with the rattle inside, ready to be inserted into the preformed cavity within the lure. 55A and 55B are end caps for rattle to hit.
Figure 41:
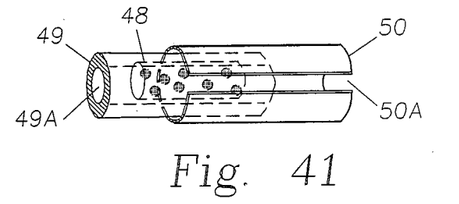
FIG. 41 illustrates a tension retainer and weight adjuster sleeve used when weight's length is same or less than the entrance slot 45. It keeps the weight locked under the sinker overlap areas 47 and 47A (see FIG. 34).
Figure 42:
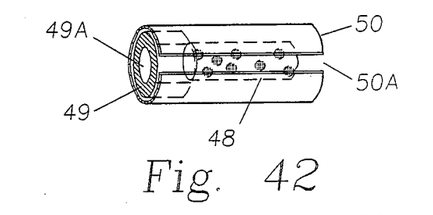
FIG. 42 illustrates a weight and rattle in a tension retainer sleeve.
Figure 43:
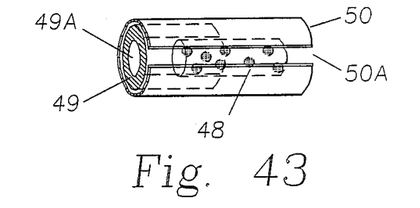
FIG. 43 illustrates additional weight in place in the tension retainer sleeve illustrated in FIGS. 41 and 42.
Figure 44:
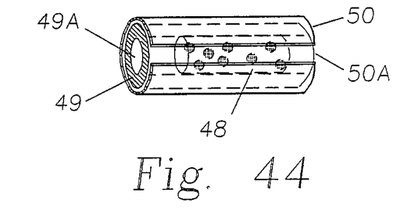
FIG. 44 illustrates the maximum amount of weight inserted in the tension retainer sleeve.
Figure 45:
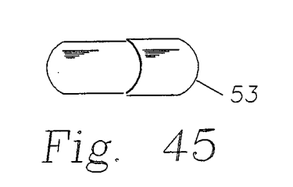
FIG. 45 is another embodiment of a sinker rattle assembly.
Figure 46:
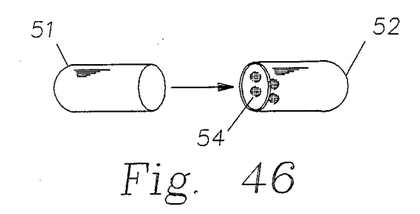
FIG. 46 illustrates the rattle embodiment of FIG. 45 opened with the rattle beads in the larger diameter half.
Figure 47:
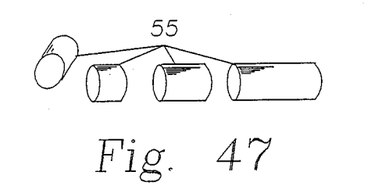
FIG. 47 illustrates different sized metal slugs 55 which function as both weights and rattles. The slugs 55 fit inside of metal weight 49A in place of or in addition to the rattle 48.

FIG. 45 illustrates another embodiment of the in-body sinker rattle shown in FIG. 34 as 49. The rattle 53 is comprised of two interfitting cylinders 51 and 52 which slide together to enclose the beads 54. Cylinder 51 is of a smaller diameter than 52 and 51 can therefore be inserted into 52 to form the assembly 53 shown in FIG. 45. Before parts 51 and 52 are assembled, the rattle and/or weight beads 54 are placed inside the hollow container. The rattle beads 54, when made of plastic, allow for a lighter weight assembly. When the rattle beads are made of metal balls, such as lead or steel ball bearings, they act as weights which can be fine-tuned by selecting material, size or quantity. The assembly 53 is the preferred embodiment due to the fact that it gives a greater amount of inside usable space for its outer dimension, and this allows better use of the space 46 inside the plastic lure. This greater room allows the rattle assembly to resonate. The metal sinker assembly 49 is hollow (see 49A). As shown in FIG. 40, the rattle 48 fits inside the sinker hole 49A but leaves enough room for one or more weights 55. FIG. 47 illustrates a plurality of weight slugs 55 which are heavier than the rattle 48 and are used when a large amount of weight is desired. The slug 55 (see FIG. 47 can be made of a length of metal that's as long as the container if a rattle is not being used in the tension adjuster sleeve.

In some instances, one might desire weight but no rattle. This is accomplished by means of a preformed foam placed between the weight and a sinker hollow end.

To insert a rattle into the preformed pocket 46 in lure body 33, the rattle 48 is installed into a hollow sinker hole 49A and then the assembled rattle and sinker is inserted into the entrance slot 45 in the lure body.

One end of the sinker is forced into slot 45 and the sinker is angled towards one end of preformed cavity 46. Once the end of sinker touches bottom of cavity 46, a slight pull on the opposite end of lure body stretches the lure material over the sinker. Once in place, sinker 49 can't be dislodged without again stretching the lure off the sinker 49.

When the tension retainer and weight adjuster sleeve 50 is used, the preceding steps will install the entire assembled weight, rattle and sleeve. To install the sleeve 50 around weight 49, 49 is forced into the sleeve 50 and then rattle 48 is inserted inside the hole 49A of weight body 49. Then the preceding steps for inserting a weight into the lure pocket 46 are followed.

The sinker pocket 46 may be used with both the protective membrane and protective pocket embodiments.

Figures 48, 49, 50:
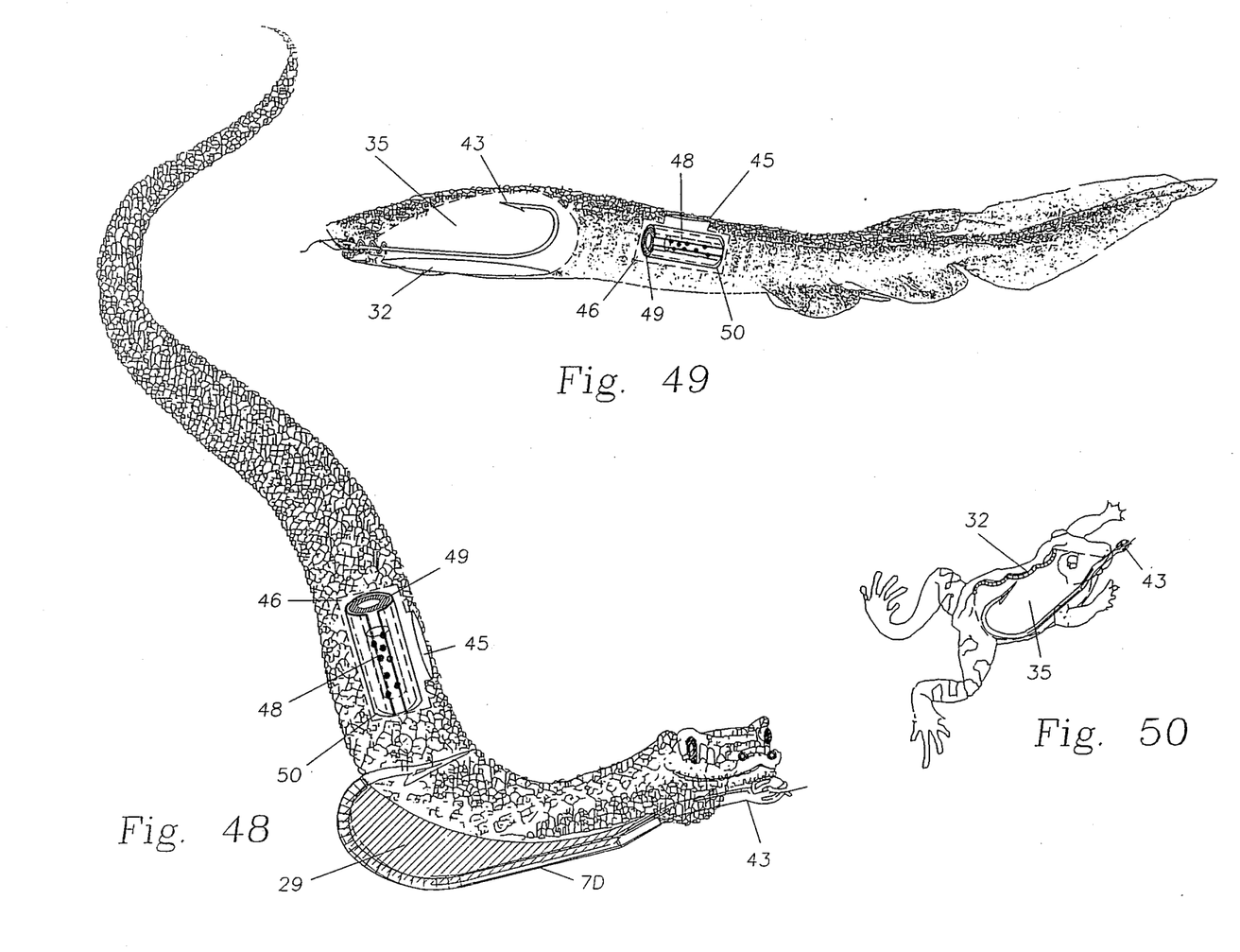
FIG. 48 illustrates an artificial lure in the shape of a snake using the protective membrane system of the present invention.
FIG. 49 illustrates an artificial lure in the shape of a lizard including a pocket with the hook point up.
FIG. 50 illustrates an artificial lure in the shape of a frog including a pocket with the hook point up.
Figures 51, 52, 53:
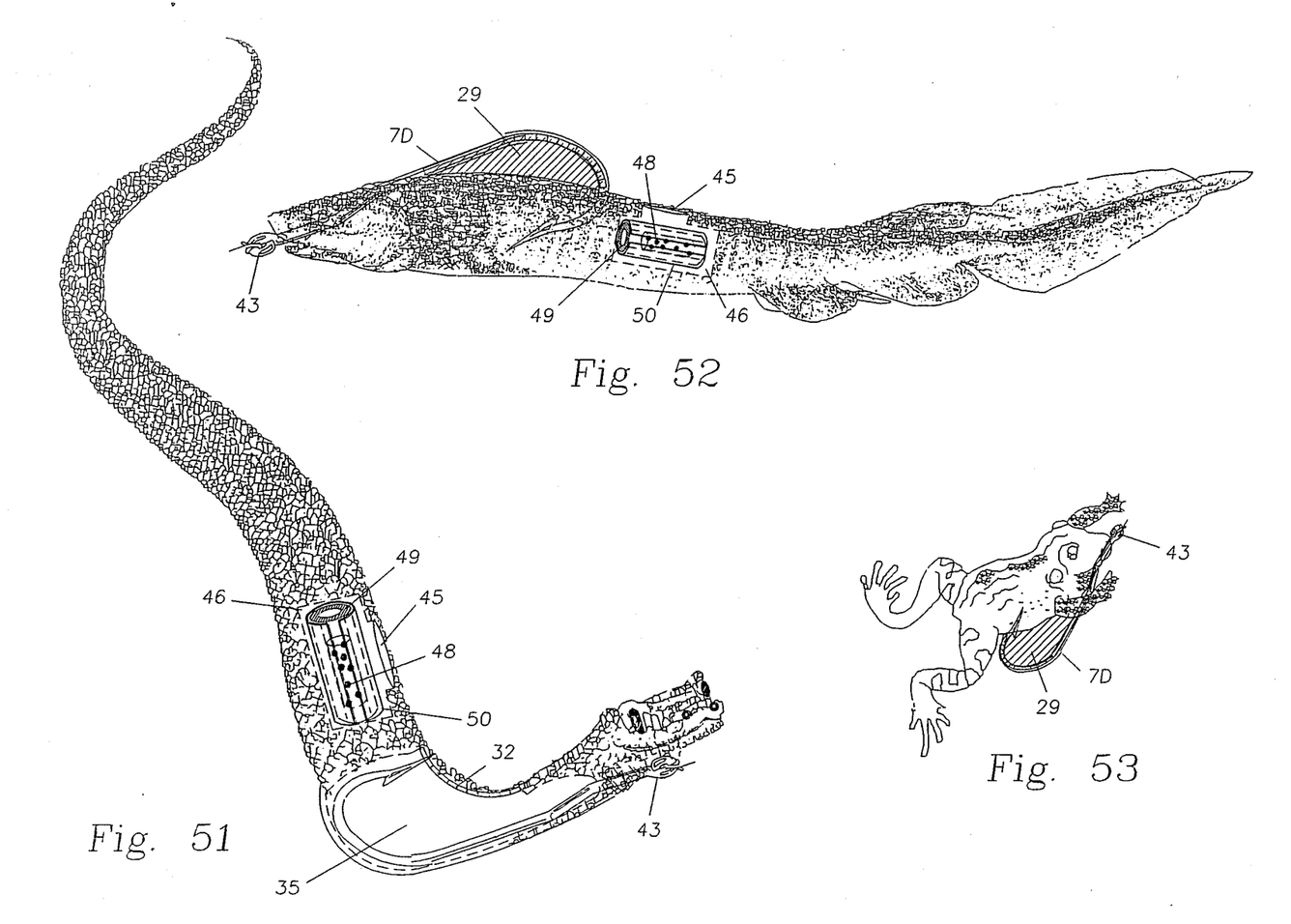
FIG. 51 illustrates an artificial lure in the shape of a snake including a pocket with the hook point up.
FIG. 52 illustrates an artificial lure in the shape of a lizard using the protective membrane system of the present invention.
FIG. 53 illustrates an artificial lure in the shape of a frog using the protective membrane system of the present invention.
Figures 54, 55, 56:
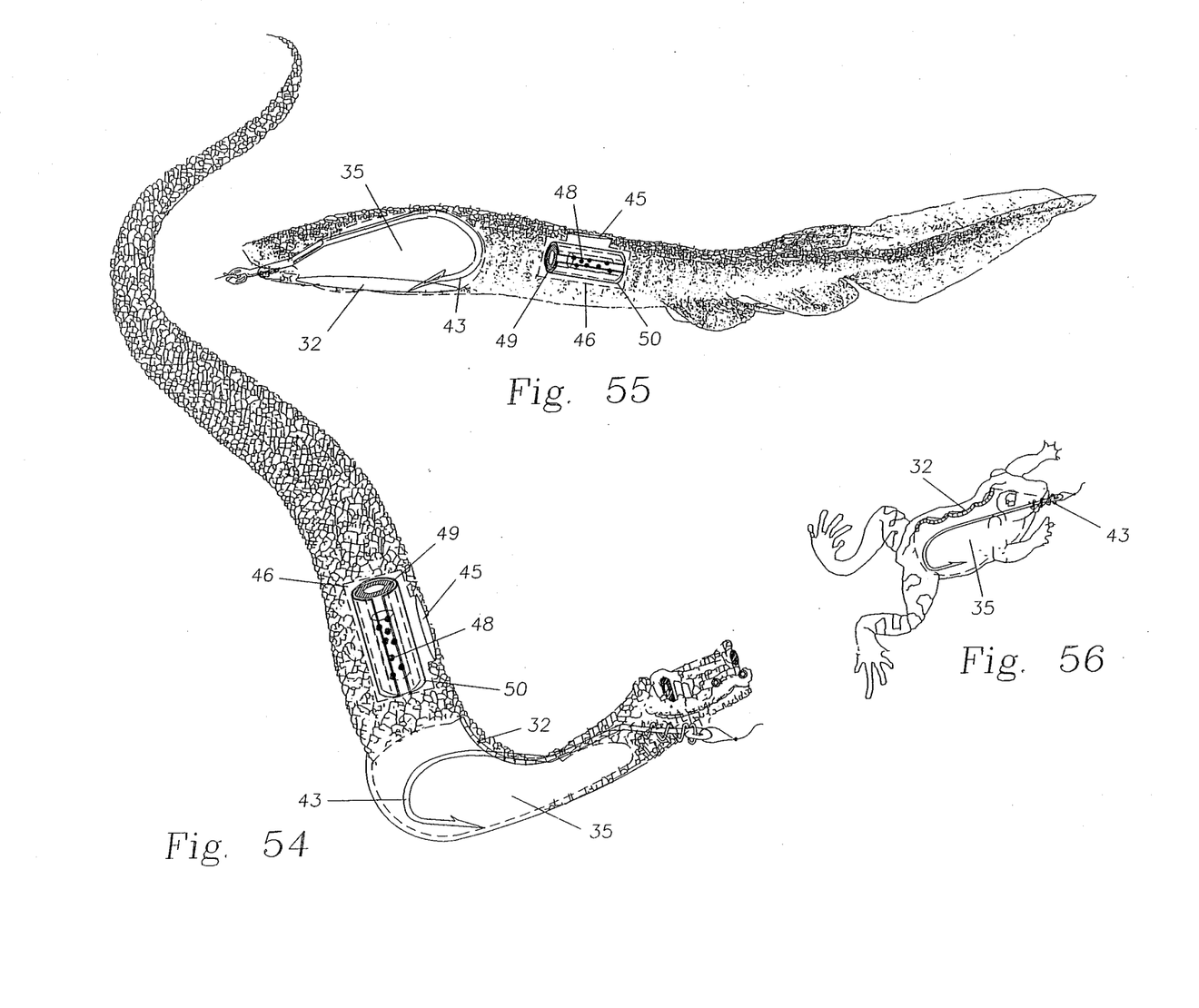
FIG. 54 illustrates an artificial lure in the shape of a snake including a pocket with the hook point down.
FIG. 55 illustrates an artificial lure in the shape of a lizard including a pocket with the hook point down.
FIG. 56 illustrates an artificial lure in the shape of a frog including a pocket with the hook point down.

The improvements to artificial baits afforded by this patent may be incorporated in lures emulating any natural or unnatural fish food. For instance, FIGS. 48, 51 and 54 illustrate the system incorporated in snake emulations. FIGS. 49, 52 and 55 depict lizard emulations incorporating the invention. FIGS. 50, 53 and 56 illustrate frog emulations.

In these figures, the hook 43 is protected by a membrane 29 or a pocket 35. In the membrane embodiments the membrane is held on the hook shank by the saddle 7D. In the pocket embodiments access to the pocket 35 is gained through the opening 32. The rattle 48 and sinker 49 are held by the sleeve 50 which is inserted in the second cavity 46 through opening 45 in the snake and lizard emulations.

While various embodiments have been shown and described, it is to be understood that various other embodiments and improvements may be made without departing from the scope and spirit of the appended claims.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What we claim is:

1. A fishing lure comprising:
   a primary lure body; and
   a membrane extending from said primary lure body for filling the space between a hook shank, the curved portion between said hook shank and the hook point, and the section of said primary lure body traversing the distance from said hook point to the point on said hook shank where said hook emerges from said lure when said lure is threaded on said hook.

2. A fishing lure as defined in claim 1, wherein said membrane includes a hook engaging edge shaped to conform to a portion of the circumference of the wire forming said hook.

3. A fishing lure as defined in claim 2, wherein said lure is an artificial worm.

4. A fishing lure as defined in claim 2, wherein said lure emulates a fish and said membrane forms a portion of the body of said emulated fish.

5. A fishing lure as defined in claim 1, including a hook entry point indicating mark.

6. A fishing lure as defined in claim 1, indicating a hook exit point indicating mark.

7. A fishing lure as defined in claim 1, including a means to indicate the entrance point for a lure securing means.

8. A fishing lure, comprising:
   a bait emulating lure body including a basic body section formed to emulate said bait in three dimensions; and
   a membrane extending from said basic body section, said membrane dimensioned to fill the gap formed between a hook and said basic body section when said hook is threaded on said basic body section.

9. A fishing lure as defined in claim 8, wherein said membrane includes a hook engaging edge shaped to conform to a portion of the circumference of the wire forming said hook.

10. A fishing lure as defined in claim 9, wherein said lure is an artificial worm.

11. A fishing lure as defined in claim 9, wherein said lure emulates a fish and said membrane forms a portion of the body of said emulated fish.

12. A fishing lure as defined in claim 8, including a hook entry point indicating mark.

13. A fishing lure as defined in claim 8, indicating a hook exit point indicating mark.

14. A fishing lure as defined in claim 8, including a means to indicate the entrance point for a lure securing means.

15. An artificial lure, comprising:
    a lure body; and
    a protective membrane attached to said lure body, said membrane dimensioned to enclose the normally open space between the junction of an attached hook and said lure body.

16. An apparatus as defined in claim 15, comprising:
    a hook; and
    said artificial lure includes an end segment having a thickness which will permit screwing a helical securing means attached to the hook's eye into said lure.

17. An apparatus as defined in claim 16 wherein said helical securing means is attached to the eye of said hook by a clip on means.

18. An apparatus as defined in claim 17 wherein said clip on means is a break-away device removable by twisting to open said clip.

19. An apparatus as defined in claim 18 wherein said artificial lure is attached to said hook by means of a helical securing device attached to said hook's eye by screwing the helix through said eye.

20. An apparatus as defined in claim 15 wherein said artificial lure has a preformed hole in its front end to show proper placement of a hook into said artificial lure.

21. An apparatus as defined in claim 20 wherein said artificial lure has a preformed hole placed to show proper exit of the hook's point, to allow proper placement of hook to lure's saddle area.

22. An apparatus as defined in claim 21 wherein said lure has a preformed hole rearward of said protective membrane to show proper reentry of the hook's point into said artificial lure for proper seating of the hook to saddle area adjacent to said protective membrane of said artificial lure.

23. An apparatus as defined in claim 15 wherein said membrane is very thin relative to said lure body and dimensioned to shield the open area caused by the meeting of hook and artificial lure material to prevent items from entering into the previously open area.

24. An apparatus as defined in claim 15 wherein said lure includes a preformed space shaped to hold a hook's eye and shank area;

said preformed space includes a preformed hole shaped to receive fishing line; and said preformed hole includes a slotted area for enclosing a hook, including the hook's point.

25. An apparatus as defined in claim 24 wherein said lure is shaped to emulate a frog.

26. An apparatus as defined in claim 24 wherein said lure is shaped to emulate a lizard.

27. An apparatus as defined in claim 24 wherein said lure is shaped to emulate a snake.

28. An apparatus as defined in claim 24 wherein said lure is shaped to emulate a fish.

29. An apparatus as defined in claim 24 wherein said lure is shaped to emulate a worm.

30. An apparatus as defined in claim 24 wherein said lure is shaped to emulate natural fish food.

* * * * *